United States Patent [19]

Gillhaus

[11] Patent Number: 4,591,337
[45] Date of Patent: May 27, 1986

[54] HEAT TREATMENT FURNACE WITH CROWN-SHAPED TRANSPORT PATH FOR THE WORKPIECES

[75] Inventor: Horst Gillhaus, Dortmund, Fed. Rep. of Germany

[73] Assignee: Ruhrgas Aktiengesellschaft, Fed. Rep. of Germany

[21] Appl. No.: 641,948
[22] PCT Filed: Dec. 14, 1983
[86] PCT No.: PCT/EP83/00336
§ 371 Date: Aug. 15, 1984
§ 102(e) Date: Aug. 15, 1984
[87] PCT Pub. No.: WO84/02390
PCT Pub. Date: Jun. 21, 1984

[30] Foreign Application Priority Data

Dec. 15, 1982 [DE] Fed. Rep. of Germany ....... 3246371

[51] Int. Cl.$^4$ .......................... F27B 9/16; F27D 3/00; F26B 15/26
[52] U.S. Cl. ....................................... 432/138; 34/147; 432/239
[58] Field of Search .................. 432/124, 138, 239; 34/147

[56] References Cited

U.S. PATENT DOCUMENTS

| | | | |
|---|---|---|---|
| 1,783,156 | 11/1930 | Talley | 266/254 |
| 2,007,009 | 7/1935 | Staples | 432/138 |
| 3,391,548 | 7/1968 | Gram | 34/147 |

Primary Examiner—John J. Camby
Attorney, Agent, or Firm—Beall Law Offices

[57] ABSTRACT

In a heat treatment furnace with a circular charge conveyor system, bar-shaped charge support elements are provided and said support elements are mobile with respect to each other both in a vertical direction and in the direction of charge travel. Said support elements are arranged substantially in a radial direction and/or in a circle or in sectors of a circle. Several such charge support elements arranged radially are preferably assembled to form fork-type elements. Said support elements may also be arranged in a plurality of vertical planes to form a continuous or a discontinuous helical-type charge conveyor system. The present invention increases throughput, if compared with a conventional furnace of the same size, reduces energy requirements and thus improves conventional pusher-type furnaces for heat treatment in a controlled atmosphere.

49 Claims, 11 Drawing Figures

HEAT TREATMENT FURNACE WITH CROWN-SHAPED TRANSPORT PATH FOR THE WORKPIECES

BACKGROUND OF THE INVENTION

1. Field of the Invention

The present invention relates to a furnace wherein the charge of workpiece is carried during heat treatment by a circular conveyor system.

2. Description of the Prior Art

Similar furnaces are known as rotary hearth furnaces consisting of a cylindrical or a rectangular furnace chamber and a rotating hearth, the charge to be treated being placed on the slowly turning hearth and travelling on said moving hearth through the different furnace zones. The hearth is mounted on bearings outside the furnace and rotated by a drive mechanism also located outside the furnace. Rotary hearth furnaces are usually operated in a cycle mode and can only be charged when a piece has been removed from the furnace. The charged piece travels stepwise from the furnace entry through the heating zone and the soaking zone to the furnace outlet.

The use of such rotary hearth furnaces has become a standard practice for heat treatment, but it is impossible to adjust the length of a rotary hearth furnace cycle. A given time is hence always required for a certain charge to travel through a given rotary hearth furnace, the rotary hearth furnace design thus determining the length of the heat treatment cycle.

It is further difficult to implement gas treating processes such as nitriding in rotary hearth furnaces, since the time during which the charge remains in the soaking zone is usually too short. Moreover, each hot tray carrying the heat-treated charge rests in the immediate vicinity of a cold tray entering the furnace, thus making it practically necessary for an empty position to be between the discharging position and the charging position. However, such an empty position is an inadequate design concept for modern heat treating applications. If a rotary hearth furnace is mounted with a charging door and a separate discharge door, radiant tubing in the area of said empty position may provide a certain thermal separation between the furnace charging zone and the furnace discharging zone. It would also be possible to separate the two zones by a baffle if arrangements are made for returning trays without their inserts from the discharging position to the charging position. Further, large rotary hearth furnaces include a large unused area in their center since it is impossible to separate cold atmosphere from hot atmosphere. In order to eliminate some of the disadvantages described, pusher-type furnaces have been used for continuously treating metal in a gaseous atmosphere. However, the surface area required for the installation of such pusher-type furnaces is considerable. Also, the chambers of pusher-type furnaces are large and therefore the energy input for heat-treating the metal pieces is high.

Additionally, trays and tray inserts for pusher-type furnaces account for some 20 to 50% of the gross charge weight. In the case of a pusher-type furnace they must be made of heat-resistant material and will be heated and cooled during each journey through the furnace, thus increasing energy consumption, and subjecting them to early wear.

SUMMARY OF THE INVENTION

It is an object of the present invention to provide for a furnace that overcomes the aforementioned problems of the prior art pusher-type furnace for treating metal pieces in a controlled atmosphere. This is accomplished increasing furnace throughput without increasing the size of the furnace and still reducing energy consumption.

It is another object of the present invention to provide a furnace incorporating a circular conveyor system, that includes a plurality of charge support elements moveable with respect to each other in both the vertical direction and the direction of charge travel. The support elements may be arranged radially or in a circle. Part of said support elements are fixed along the inner circumference of said circular charge conveyor system and part of said charge support elements are fixed along the outer circumference of said charge conveyor system so that a first group of support elements so fixed along said inner circumference and a second group of support elements so fixed along said outer circumference may be lifted and lowered and rotated relative to each other. The support elements within each such group are angularly spaced. This angular spacing may be sufficiently wide for the groups of such support elements to. If the support elements are arranged radially, several such elements may be grouped to form fork-shaped elements.

In a preferred embodiment of the present invention, the charge support elements, consisting of bars or fork-shaped elements, are arranged in several planes laid out in the vertical direction. Further, the conveyor system is divided along its circumferential length into a plurality of segments. Each segment includes at least one of the corresponding inner circumference support elements and between at least one of the corresponding outer circumference support elements. To form at least part of a helical arrangement of the conveyor system, at least two adjacent segments are spaced vertically apart from one another, so each segment is in a different plane extending horizontally with respect to the central axis of the furnace. If all of the support elements are grouped into these segments, then a stain-like arrangement of the conveyor system could be formed, such that a continuous or discontinuous helical path of travel of the workpieces inside the furnace is created. Then, as a workpiece is transferred from one horizontal plane to a different horizontal plane, the workpiece is also carried forward in the direction of charge travel.

In accordance with the present invention, the group of support elements fixed along the inner circumference or the group of support elements fixed along the outer circumference of the conveyor system may be lifted, lowered and moved in a circular direction. It is also possible for some of said support elements to be lifted or lowered and some other support elements to be moved in a circular direction. These movements cause the charge to be carried forward by the conveyor system of the furnace. In the case of a helical arrangement the charge may also be carried upwardly or downwardly in addition to being carried forward, in the direction of charge travel.

In a preferred embodiment of the present invention, the furnace is equipped with an additional center cylinder also mounted with charge support elements. The elements facing the inner furnace area interact with the elements fixed along the inner furnace circumference and the elements facing the outer furnace area interact with the elements fixed along the outer circumference and facing the inner furnace area. If said center cylinder is designed for lifting, lowering and rotating movement, the travel of the charge through the inner part of the conveyor system may be in the upward direction and the travel of the charge through the outer part of the conveyor system may be in the downward direction, the support elements forming a type of helical arrangement. In a further embodiment, the lifting, lowering and rotating movement may be by the inner and the outer cylinders in lieu of the center cylinder.

In accordance with the invention each charge support element does not carry more than one piece to be heat-treated, and therefore the material of said support elements may be ceramic. Further no trays are required for carrying the charge through the furnace, although small baskets may preferably be used for charging bulk material for heat treatment.

In another embodiment of the present invention, the atmosphere in the furnace chamber is circulated by one or several fans mounted in the upper or lower furnace areas. Atmosphere circulation may be facilitated by the arrangement of appropriate atmosphere outlet openings in the inner cylinder. Further the shafts of any such fans may be of the hollow type for the installation of temperature or oxygen probes through such hollow shafts.

Since the furnace chamber will usually be limited by the inner and the outer cylinders and since the furnace chamber may be isolated from ambient air, the furnace provided for by this invention may easily be used for treating metal pieces in a controlled atmosphere and even if no inner or outer cylinder is provided, an additional wall may easily be mounted.

These and other objects and features of the present invention will now be described, with reference to the accompanying drawings.

Figure 1:
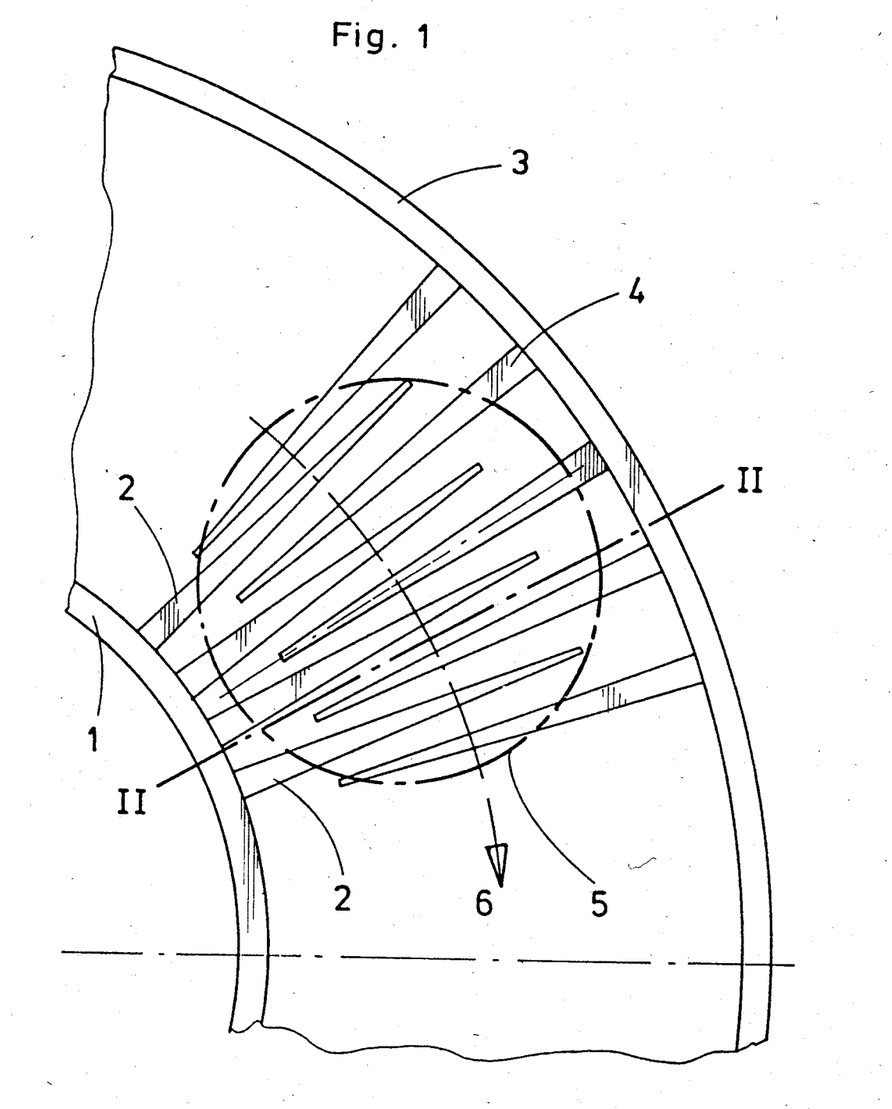
FIG. 1 is a top view of a conveyor system mounted with radially arranged bars.

Referring first to FIG. 1, the schematic shows part of a conveyor system. The charge support elements fixed to the inner cylinder 1 are angularly spaced bars 2 arranged radially and protruding towards the outer furnace area. Similar bars 4 of a corresponding arrangement, but protruding towards the inner furnace area are mounted to the outer cylinder 3. Bars 2 and 4 can be equal strength. A piece to be treated 5 which is represented by broken lines and may, by way of example, be of a circular shape rests on said bars. If bars 2 and 4 are moved relative to each other by lifting, moving in a circular direction and lowering, piece 5 will travel in the direction of arrow 6. Further, the points of support on which the pieces rest, change continuously as a result of the mode of charge travel, thus eliminating the risk of inadequate heat treatment of piece 5 at such support points.

Figure 2:
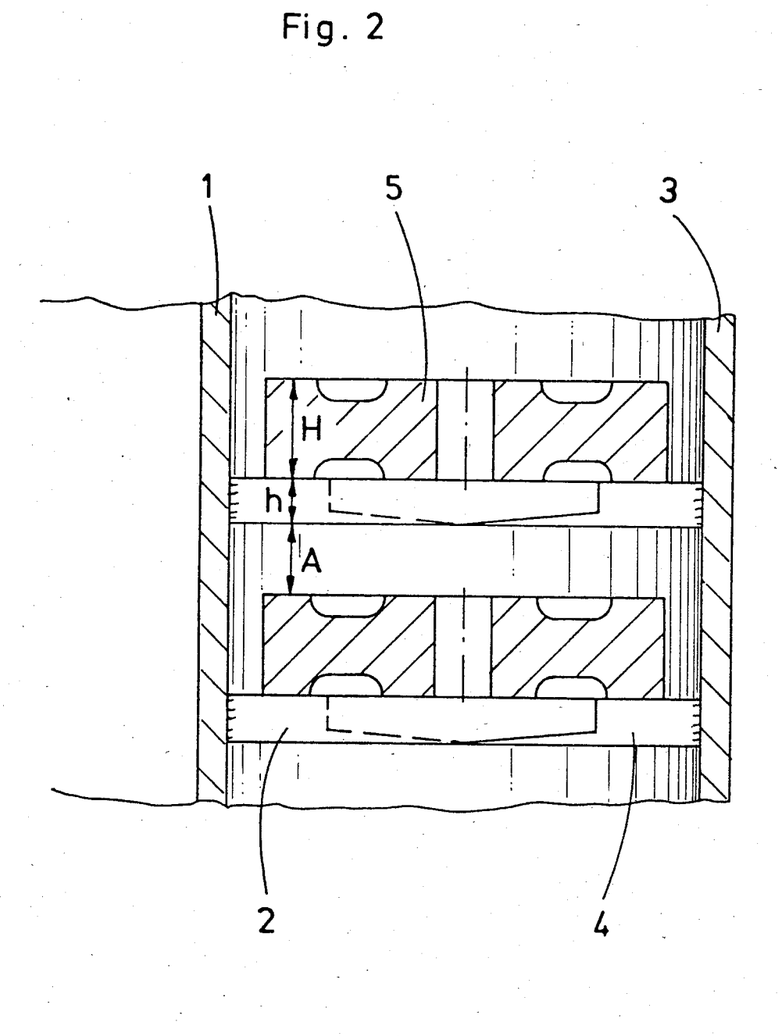
FIG. 2 is a section along the II—II line of FIG. 1.

The section along the II—II line of FIG. 1 shown by FIG. 2 presents the vertical arrangement of the conveyor system invented. The bars 2 mounted to the inner cylinder 1 and the bars 4 mounted to the outer cylinder 3 carry piece 5. If the height of said piece is H and the height of said bars is h, the distance A between piece 5 and the bars 2 and 4 above said piece 5 will have to be greater than height h for pieces not to touch each other during the movement of rotation.

Figure 3:
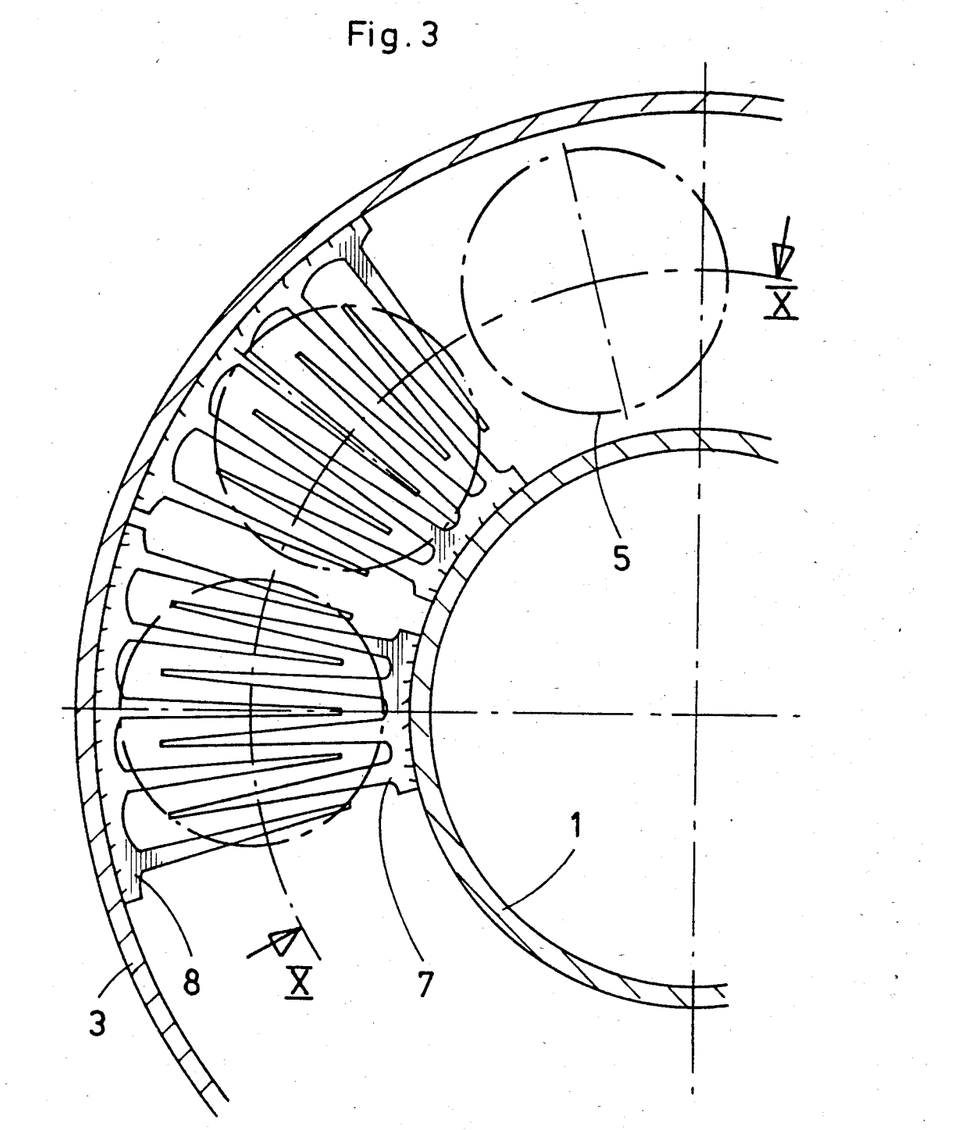
FIG. 3 is a view similar to FIG. 1 showing bars arranged radially.

FIG. 3 also shows part of the conveyor system, but the charge support elements mounted to the inner cylinder 1 are fork-shaped or hair pin shaped elements 7 in lieu of bars, said fork-shaped elements protruding towards the outer furnace area. The and the support elements mounted to the outer cylinder 3 are corresponding fork-shaped elements 8 protruding radially to the inner furnace area. Said conveyor system operates as described above for the conveyor system shown by FIG. 1 and as in FIG. 1, the charge 5 is shown by broken lines.

Whereas FIGS. 1 and 3 show the circular arrangement of the conveyor system, the figures do not show the horizontal cross-section of the furnace, a circular horizontal furnace cross-section like the horizontal cross-section of the circular conveyor system minimizing heat loss, but being usually difficult to manufacture. The furnace shape will hence preferably be hexagonal or octagonal rather than tetragonal even if a tetragonal furnace shape would also represent an embodiment of the present invention.

Figure 4:
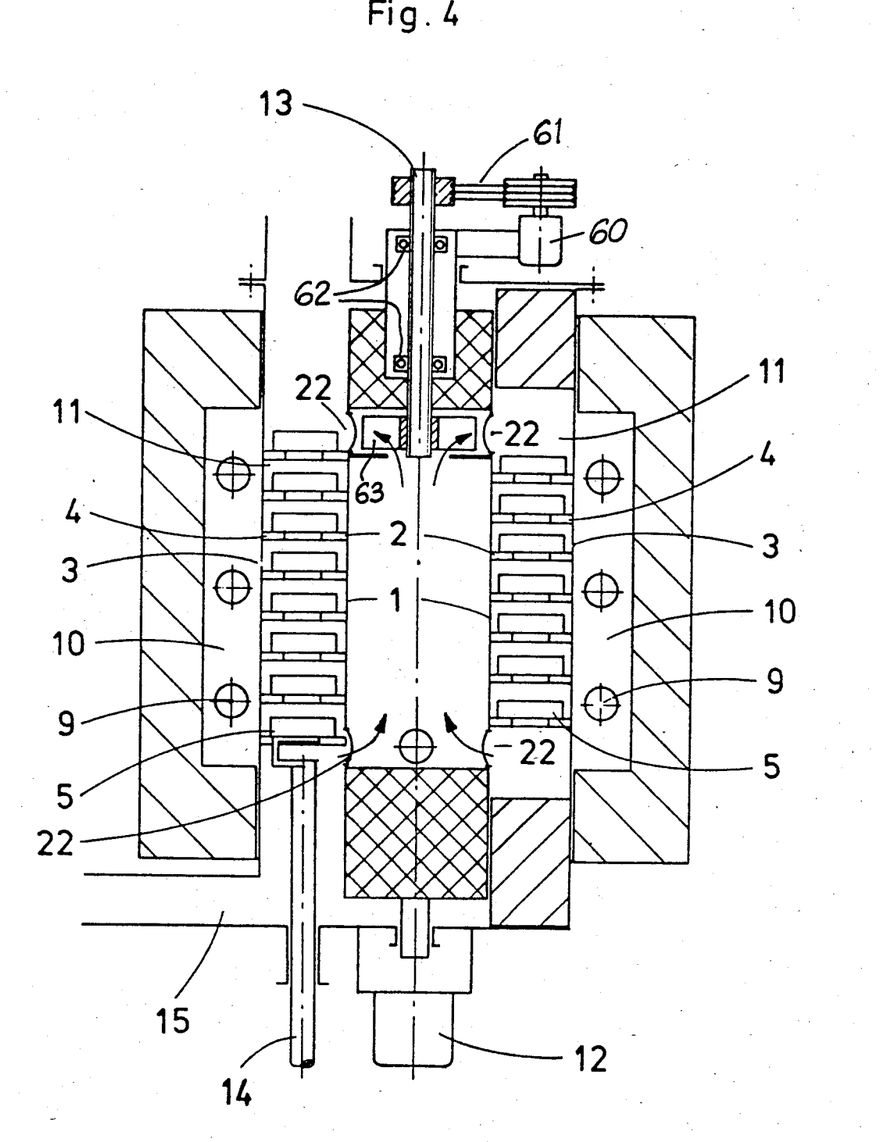
FIG. 4 is a section of a furnace embodying the present invention.

FIG. 4 is a longitudinal section of an embodiment of the present invention. Bars 2 protruding radially to the outer furnace area are again mounted to the inner cylinder 1 and corresponding bars 4 protruding radially to the inner furnace area are mounted to the outer cylinder 3, said bars carrying pieces to be treated 5. The furnace embodied in FIG. 4 is heated by burners 9. The outer cylinder 3 may separate the burner zone 10 from the heat treatment chamber 11 to eliminate any effect of flue gas on the atmosphere in the furnace chamber 11. The inner cylinder 1 is provided with openings 22 for ventilation or for the introduction of certain gases into the furnace chamber.

In the embodiment of the present invention shown by FIG. 4, a motor 12 located below the inner cylinder 1 provides the lifting, lowering and rotating movement for inner cylinder 1 that causes support elements 7 to be lifted, lowered, and moved in a circular direction. A hollow shaft 13 is provided in the upper part of the arrangement for the measurement of the temperature and the oxygen content of the furnace atmosphere by probes that are introduced to the furnace atmosphere through shaft 13. Certain gases can also be introduced into the furnace chamber through shaft 13. As can be seen in FIG. 4, a motor 60 is provided to drive shaft 13 in rotation through drive connection 61. Bearings 62 are provided to mount shaft 13 for rotation. Preferably, a fan 63 is mounted on shaft 13 for fixed rotation therewith.

In FIG. 4, the conveyor system is laid out in a helical arrangement. The furnace is charged from the top in a manner not shown and the pieces 5 to be treated travel downwardly along the helically arranged conveyor system. At the lower end of the furnace, pieces 5 are picked up by a rod 14 and then introduced into ducting 15 for a subsequent transfer of the treated charge by a mechanism not shown to an oil quench tank or a downstream furnace. The helical arrangement depicted may be continued further in the downward direction for direct transfer to the conveyor mechanism of ducting 15.

If the embodiment of the present invention depicted by FIG. 4 is compared with a pusher-type furnace and if the assumption is made that a charge volume of approx. 2 m³ is desired, the necessary furnace chamber volume of 30 m³ in the case of a pusher-type furnace and 10 m³ in the case of a furnace of the type depicted by FIG. 4, hence reducing the furnace chamber volume required for handling the same charge volume to ⅓rd and thus also reducing the quantity of bricks needed for constructing the furnace to ⅓rd. Moreover, the surface area required for the installation of the furnace is decreased by half and the energy required for maintaining the furnace temperature while the furnace is idle (idle furnace consumption) is lowered from approx. 120 kW in the case of a pusher furnace to ⅓rd or approx. 40 kW in the case of a furnace of the type depicted by FIG. 4.

Figure 5:
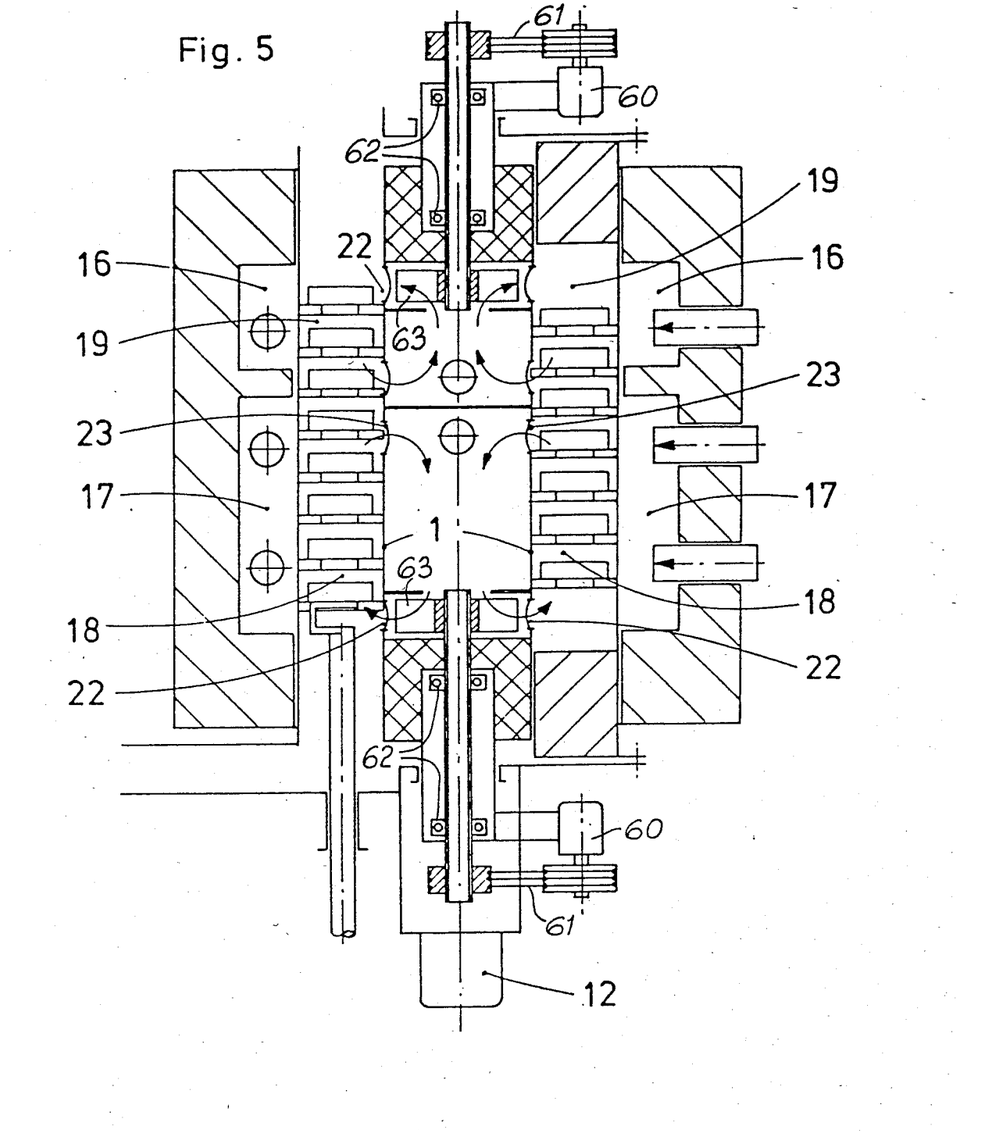
FIG. 5 is another embodiment of a furnace in accordance with the present invention.

FIG. 5 shows another embodiment of the present invention. The parts of FIG. 5 that are similar to the parts of FIG. 4 are indicated with like reference numbers. Motor 12 is located below the furnace as in the embodiment of the invention shown by FIG. 4. However, the furnace depicted by FIG. 5 consists of two temperature zones, the heating zone 16 and the soaking zone 17. Atmosphere circulation to said two zones also differs in accordance with the different functions of said two zones. The atmosphere for chamber 18 of the soaking zone 17 flows through a hollow shaft that enters chamber 18 through opening 22 and return to the furnace area inside the inner cylinder 1 through opening 23. The atmosphere for the heating zone chamber 19 is provided in a similar manner as depicted by FIG. 5. The atmosphere for the heating zone usually differs from the atmosphere for the soaking zone. In FIG. 5 a fan 63 is provided at each end of the furnace, one in each of the two temperature zones 16 and 17. The fans are provided with suitable drive means as discussed with respect to the FIG. 4 embodiment.

Figure 6:
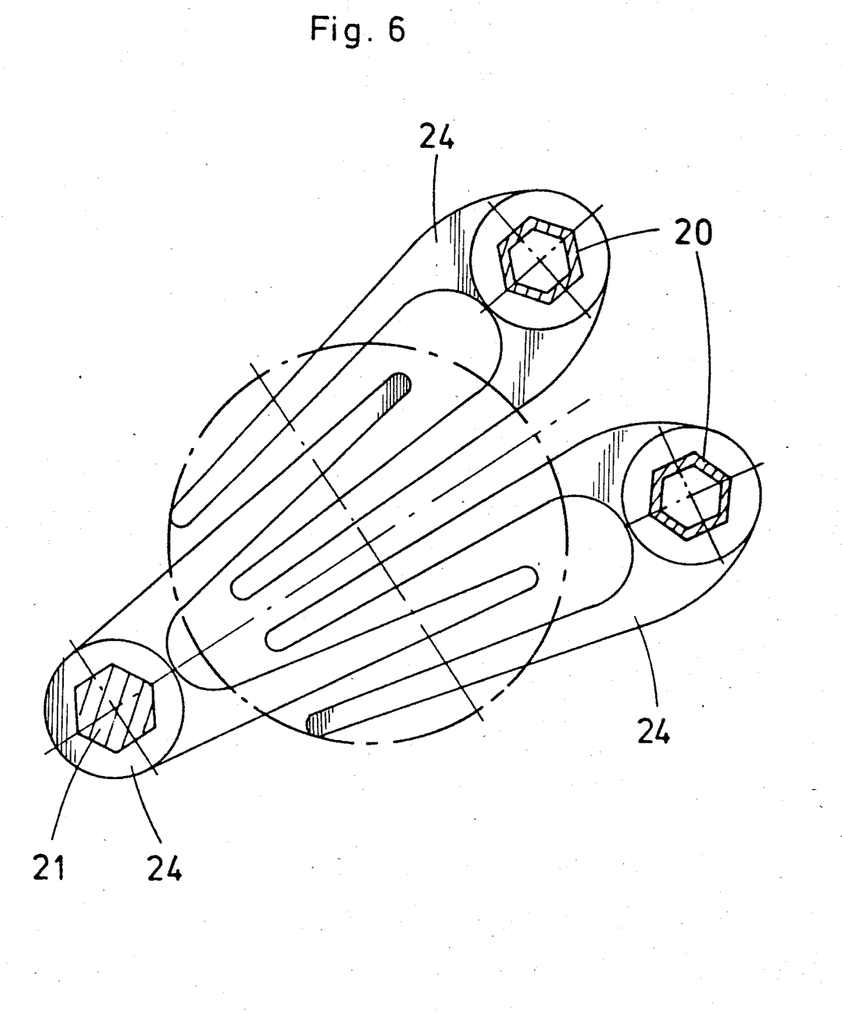
FIG. 6 is another embodiment of a charge support system arranged radially.

FIG. 6 shows an embodiment of the present invention differing from the embodiments shown by FIGS. 1 and 2, the inner and outer cylinder walls being replaced by columns 20 and 21 with columns 21 being arranged along the inner circumference and columns 20 being arranged along the outer circumference of the furnace. The cross-sections of said columns are hexagonal and said columns may consist of hollow or solid sections. The fork-shaped or hairpin shaped elements 24 are placed on said columns and if the column 21 part of the conveyor system is raised, moved in a circular path and lowered, the piece to be treated is moved as discussed in the description of FIG. 1. The embodiment of the present invention shown by FIG. 6 is particularly suited for the use of ceramic charge support elements and, if necessary, an additional wall may be provided between the furnace chamber proper and the burner area or the furnace chamber proper and the inner furnace area, which may thereby be used for atmosphere circulation. The columns may be of any cross-section, but if said columns consist of sections with a circular cross-section, it will be necessary to provide for grooves or ribs to arrest the fork-shaped elements and to prevent movement around the column.

Figure 7:
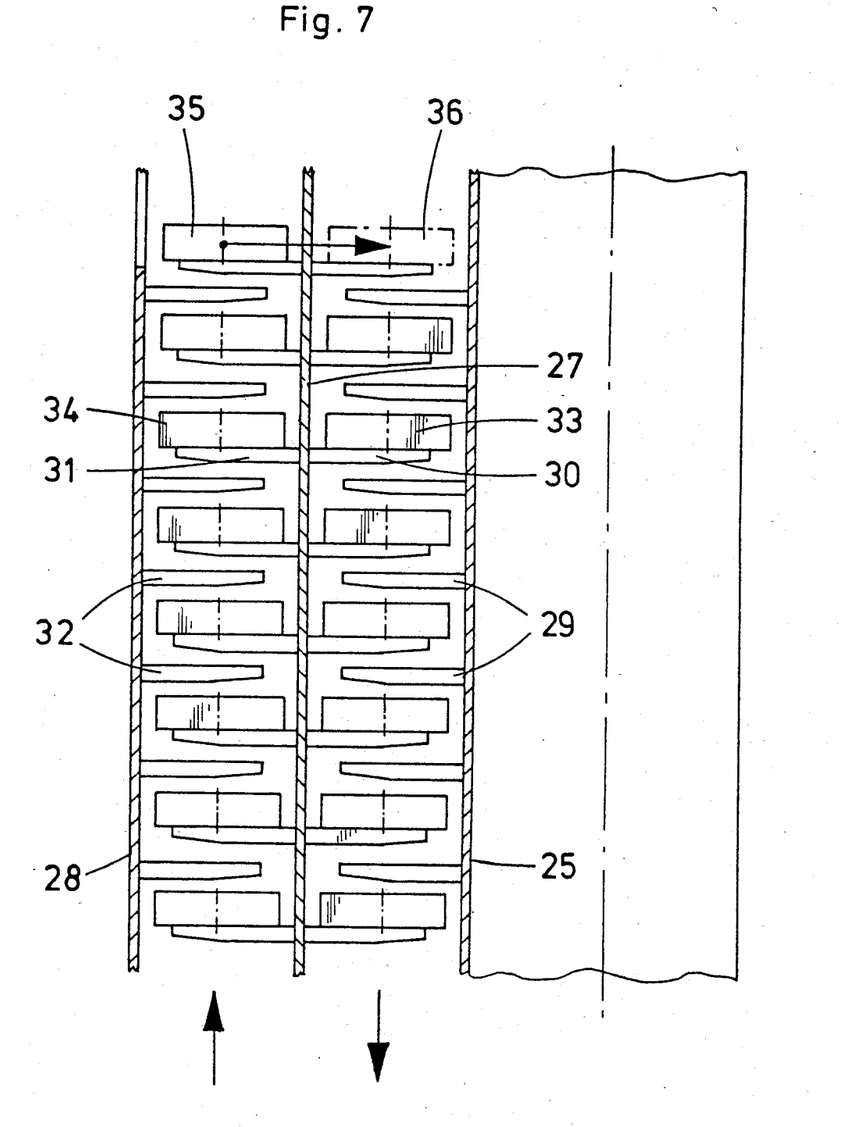
FIG. 7 is an embodiment of the present invention showing a double helical arrangement.

FIG. 7 shows an embodiment of the present invention in which the furnace conveyor system arrangement is of the double helix type. Similar to the arrangements shown by FIGS. 1 and 3, bars 29 are mounted toward an inner cylinder 25 and protrude radially to the outer furnace area, and bars 32 are mounted to an outer cylinder 28 and protrude radially toward the inner furnace area. Additionally, a center cylinder 27 has mounted thereon bars 30 protruding radially toward the inner furnace area and bars 31 protruding radially toward the outer furnace area. The pieces to be treated 33 and 34 rest on bars 30 and 31. Center cylinder 27 rotates about the same point of rotation as the other two cylinders referred to and is also lowered and lifted. Rotation of cylinder 27 provides bars 30 and 31 with movement along a circular path. Following the circular movement, piece 33 is placed on bar 29 and piece 34 is placed on bar 32. Preferably, the pieces enter the furnace at the bottom of the outer helical arrangement and leave the furnace at the bottom of the inner helical arrangement. At the top ends of the two helically arranged conveyor systems, piece 35 is moved into position 36 where it is received by the inner helically arranged system. The furnace charging operation may differ from the mode presented above and the charge may enter the furnace through the inner helically arranged system and leave the furnace from the outer helically arranged system. Charging may be from the top, or from the bottom as shown by FIG. 7. The first part of the charge travel through the furnace will usually be for heating the charge while the latter part using for example, the inner helically arranged system as shown by FIG. 7, will be for charge soaking.

Figure 8:
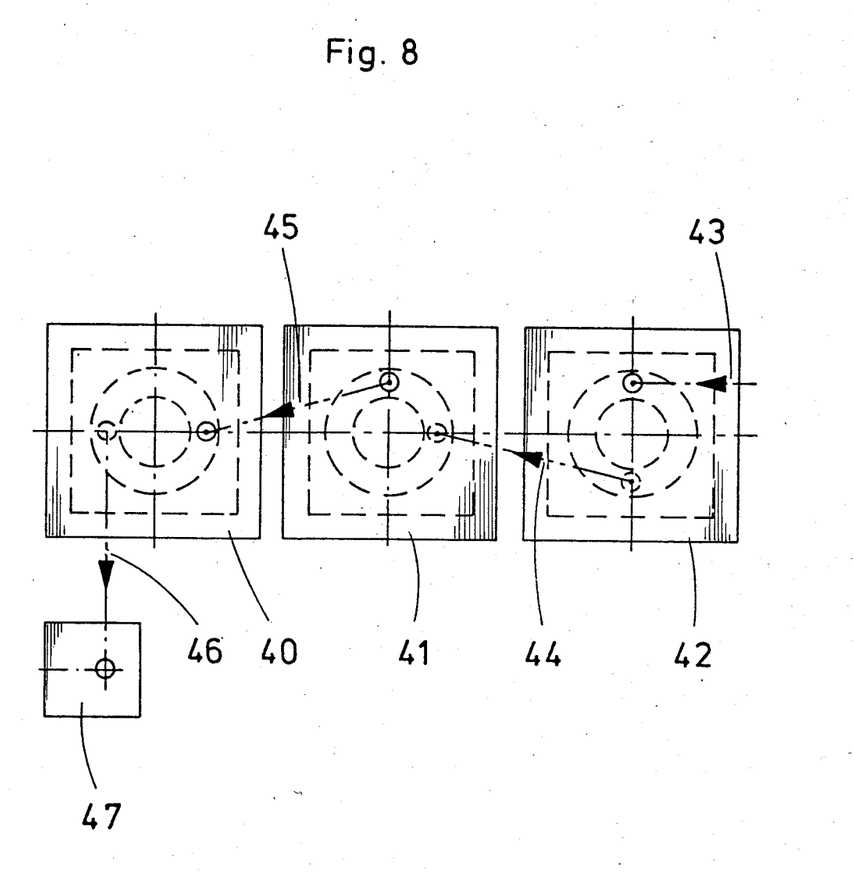
FIGS. 8 and 9 represent lines of several furnaces in accordance with the present invention.
Figure 9:
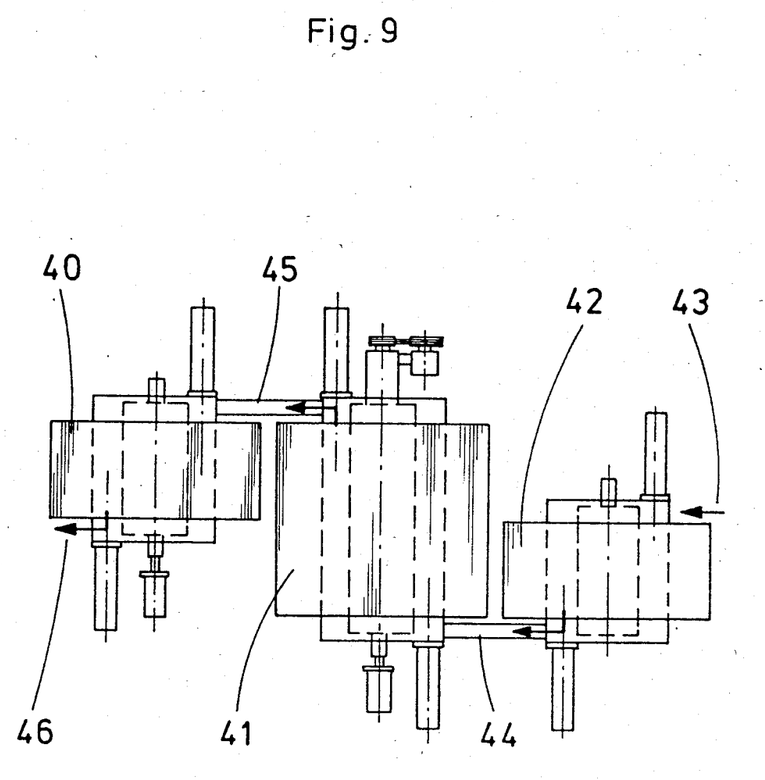

FIGS. 8 and 9 show the combined use of several of the furnaces which are the object of the present invention. Furnace 42 is used for heating, furnace 41 for soaking and furnace 40 is operated at a lower temperature, with quench bath 47 being provided for hardening. Furnace 42 is charged as shown by arrow 43 and the charge leaving said furnace at the bottom end of the helically arranged conveyor system is transferred through duct 44 to furnace 41 where said charge travels in an upward direction and is then transferred through duct 45 to furnace 40. Following travel through furnace 40, the charge leaves said furnace as shown by arrow 46 for transfer to the quench bath 47.

Figure 10A:
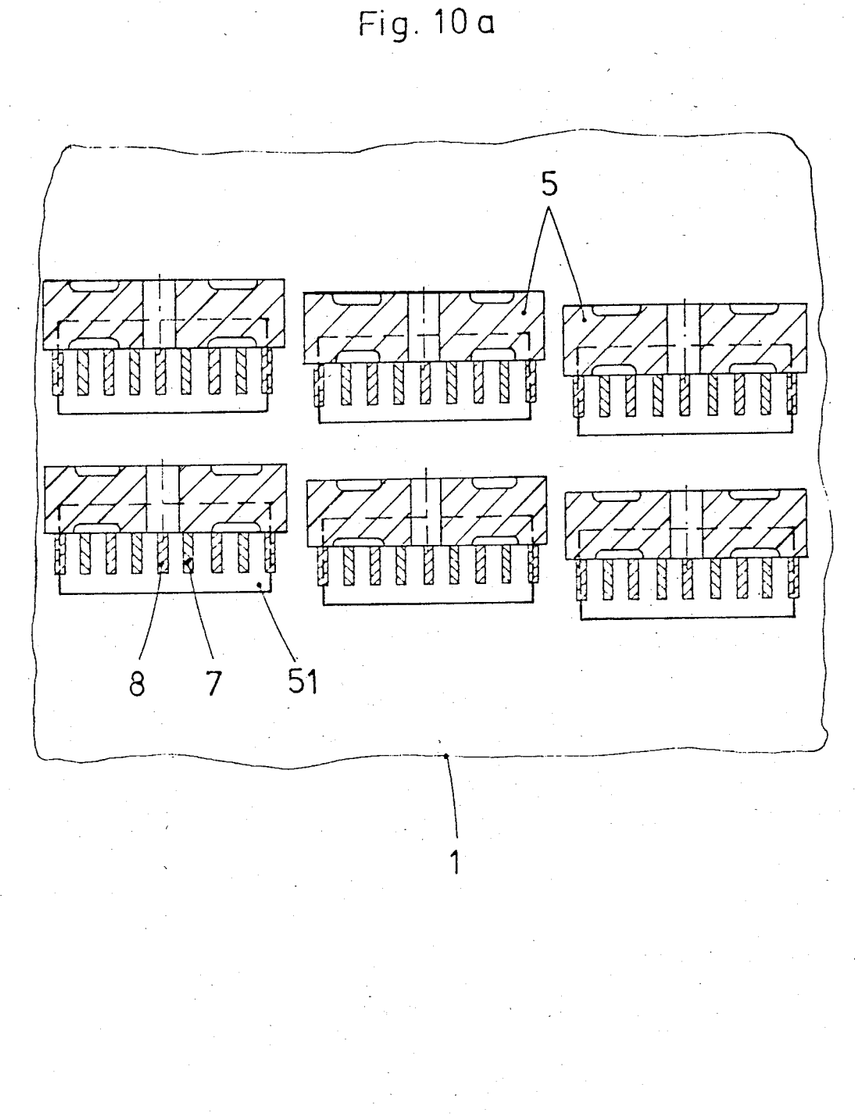
FIGS. 10a and 10b are sections along the X—X line in FIG. 3.
Figure 10B:
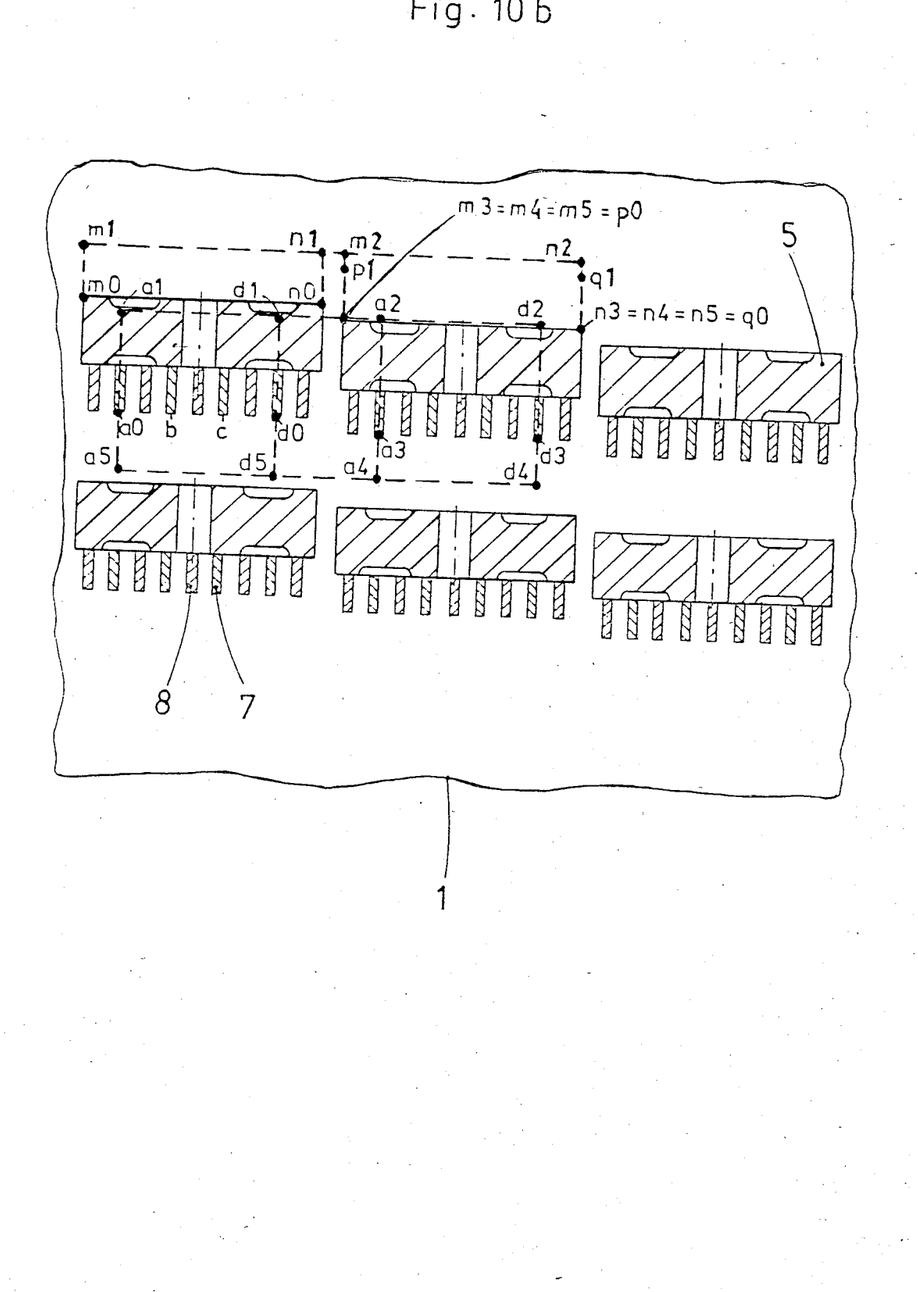

FIGS. 10a and 10b are sections along the X—X line of FIG. 3. FIG. 10a shows the fork-shaped elements 7 mounted to the unrolled wall 1 of the inner cylinder. The mounting elements 51, which may be termed flanges, carry the charge support elements 7 at their ends not facing said wall. Said support elements 7 and the support elements 8 mounted to the outer cylinder 3 move the pieces to be treated 5. In the embodiment of the invention shown, to carry the charge forward, the inner cylinder with the support elements 7 mounted thereon is lifted, rotated and lowered, while the outer cylinder 3 corresponding support elements 8 remains stationary.

The travel of charge 5 is explained with reference to FIG. 10b. Prior to the lifting, lowering and rotating movements of cylinder 1, all support elements are in their initial positions as shown in the top left corner of FIG. 10b. Support elements 7, mounted to the inner cylinder, are designated as a through d. The movement of the ends of said support elements 7 is described below. Upon the commencement of said movement, said elements are in the initial position indicated by points a0 and d0, the support elements 7 and 8 extending radially toward each other and extending in between each other. The top left point of the charge is designated m and the top right point of the charge is designated n, their initial positions being indicated m0 and n0 respectively. As elements 7 raised, all pieces to be treated are first lifted and then carried forward by rotation of inner cylinder 1. The description below will merely explain, by way of example, the movement of the top left piece. Following the lifting operation, the bottom ends of the elements are at points a1 and a2, while the top corners of piece 5 are at points m1 and n1. During the circular movement, the elements a to d move to the right carrying piece 5 forward, the circular movement ending when the ends of elements a to d have reached points a2 and d2 and the top corners of piece 5 have reached points m2 and n2. As the elements 7 are then lowered, piece 5 is placed on element 8 fixed to the outer cylinder, as the elements 7 reach points a3 and d3 and the top corners of piece 5 reach points m3 and n3. The elements 7 then continue to be lowered until they reach points a4 and d4. Through the ensuing rotation of cylinder 1, the elements 7 then move to the left to points a5 and d5, the rotating movement then ending and the elements being again raised to their initial positions a0 and d0 for a new cycle to commence. During the period while the elements return from points a3 to d3 to points a0 and d0, piece 5 will continue to be carried by elements 8, the upper corners of piece 5 resting in the same positions m3, m4, m5 and p0 and n3, n4, n5 and q0 respectively. During the next lifting cycle, the center piece will only be raised to points p1 and q1, since it will be moved to the lower position on the right hand side.

FIGS. 10a and 10b depict a stair-type arrangement of the charge support elements. In another embodiment, such arrangement may be level, but if fork-type elements are used, a stair-type arrangement is preferably selected.

FIGS. 1 through 9 merely depict, by way of example, several embodiments of the present invention. Downward travel may, for example, also be achieved by rollers on which the charge travels downward due to its own weight. It is hence unnecessary to provide for bars for downward travel.

The ducting at the inlet and the outlet of the furnace shown in FIGS. 8 and 9 may be replaced by ducting connected to the heating zone 16 or the soaking zone 17 of a furnace of the type shown by FIG. 5 for achieving different temperature curves during heating or soaking.

To increase furnace throughput, the two helical arrangements shown by FIG. 7 may be arranged for charge travel in the same upward or downward direction.

Obviously many modifications and variations of the present invention are possible in light of the above teachings. Thus it is to be understood that within the scope of the appended claims, the inventor may be practiced then as specifically described.

What we claim is:

1. A furnace for heating workpieces comprising:
a furnace chamber having a vertical central axis;
means for charging and discharging the workpiece to and from said furnace chamber;
conveyor means arranged substantially concentrically with respect to said axis, for conveying the workpieces within at least a portion of said furnace chamber;
said conveyor means comprising a first group and a second group of radially extending open ended workpiece support elements, said first group of support elements being movable relative to said second group of support elements in substantially vertical directions parallel with respect to said axis and in substantially circular directions concentric with respect to said axis such that said relative movement provides step wise travel of the workpiece in a direction of travel concentric with said axis, the workpiece being supported alternately by said first and said second group of support elements at alternating points of engagement along the bottom suface of the workpieces;
said conveyor means having radially separated inner and outer portions;
first mounting means for supporting said first group of support elements and second mounting means for supporting said second group of support elements;
said first group of support elements being mounted on said first mounting means along said inner portion of said conveyor means and said second group of support elements being mounted on said second mounting means along said outer portion of said conveyor means;
at least one of said mounting means being movable to provide said relative movement between said groups of said support elements; and
said relative movement being defined by first vertical relative movement between said first and said second groups of support elements, second lateral relative movement along a circular path of travel relative to said axis between said first and said second group of support elements, and third vertical movement between said first and said second groups of support elements such that each element of one of said groups is raised above and lowered below at least one element of the other of said groups and further such that said each element passes at both sides laterally of said at least one element in a closed loop during one cycle of said relative movement between said first and said second groups of support elements.

2. The furnace of claim 1, further including motor means for driving said at least one movable mounting means to cause said relative movement in directions parallel to and concentric with said axis between said first and said second groups of support elements.

3. The furnace according to claim 1, wherein at least one of said groups of support elements comprise bar elements having opposed ends, said bar elements being mounted to said mounting means at one of said ends.

4. The furnace according to claim 3, wherein said bar elements are arranged in equal circumferential spacing along said inner and said outer portions of said conveyor means.

5. The furnace according to claim 1, wherein said conveyor means is arranged in the shape of a circle having an origin intersecting with said axis.

6. The furnace according to claim 3, wherein said bars are further grouped together and arranged within separate adjacent sectors along each of said inner and said outer portions of said conveyor means.

7. The furnace according to claim 1 further including fork shaped elements comprising at least two of said support elements and being arranged within separate adjacent sectors along each of said inner and outer portions of said conveyor means, said fork shaped elements further including mounting means for mounting said fork shaped elements to one of said inner and said outer mounting means.

8. The furnace according to claim 3, wherein said bar elements of said first group are arranged in a plane extending horizontally with respect to said axis, and said bar elements of said second group are arranged in a plane extending horizontally with respect to said axis.

9. The furnace according to claim 7, wherein said fork elements of said first group are arranged in a plane extending horizontally with respect to said axis, and said fork elements of said second group are arranged in a plane extending horizontally with respect to said axis.

10. The furnace according to claim 1, wherein said first mounting means is movable to cause said relative movement in directions parallel to and concentric with said axis between said first and said second groups of support elements, and said second mounting means is stationary relative to said first mounting means.

11. The furnace according to claim 1, wherein said first mounting means comprises a cylinder arranged concentrically with said axis.

12. The furnace according to claim 1, wherein said second mounting means comprises a cylinder arranged concentrically with said axis.

13. The furnace according to claim 1, further comprising:
said furnace chamber having vertically separated top and bottom portions; and
said first and said second mounting comprise a plurality of columns extending between said top and said bottom furnace portions, said columns being substantially parallel to said axis.

14. The furnace according to claim 1 further comprising:
said furnace chamber including top and bottom portions; and
one of said first or said second mounting means comprises a plurality of columns extending between said top and said bottom portions of said furnace and the other of said first and said second mounting means comprising a cylinder extending between said bottom and said top portions of said furnace.

15. The furnace according to claim 1, wherein said discharging means includes means for conveying the workpieces to a quench bath.

16. The furnace according to claim 1, wherein said furnace chamber comprises a continuous tubular structure suitable for containing a gas, said furnace chamber further including at least one fan means for circulating the gas.

17. The furnace according to claim 2, further comprising: top and bottom end portions, and said motor means being located at said bottom end portion of said furnace.

18. The furnace according to claim 1, wherein said conveyor means is arranged helically about said axis.

19. The furnace according to claim 1, wherein said conveyor means is divided along its circumferential length into a plurality of segments, each of said segments including at least one element of said first group of support elements and at least one element of said second group of support elements, and at least two of said segments are spaced vertically apart from one another, such that as a workpiece advances along said conveyor means from one said segment to an adjacent and vertically spaced said segment, the workpiece is transferred from one horizontal plane to a different horizontal plane with respect to said axis.

20. The furnace according to claim 19, wherein each of said segments exists in a horizontal plane spaced vertically from an adjacent said segment such that a continuous helical arrangement of said conveyor means is provided and so further that the workpieces are conveyed from said charging means to said discharging means in a helical path of travel.

21. The furnace according to claim 1, further comprising:
said conveyor means being arranged helically about said axis;
said furnace chamber having top and bottom portions; and
said first and said second mounting means comprises first and second cylinders extending between said top and said bottom portions of said furnace chamber.

22. The furnace according to claim 1, further comprising:
said conveyor being arranged helically about said axis; and
fork-shaped elements comprising at least two of said support elements and being arranged within separate adjacent sectors along each of said inner and outer portions of said conveyor means, said fork-shaped elements furthing including mounting means for mounting said fork-shaped elements to one of said inner and said outer mounting means.

23. The furnace according to claim 18, wherein at least one of said groups of support elements comprise bar elements having opposed ends, one of said ends being mounted to said mounting means.

24. The furnace according to claim 1 further comprising:
said conveyor means being arranged helically about said axis;
said furnace chamber including top and bottom portions; and
said first and said second mounting means comprising columns extending between said top and said bottom portions of said furnace chamber.

25. The furnace according to claim 13, further comprising:
fork-shaped elements comprising at least two of said support elements, said fork-shaped elements further including mounting means for mounting said fork-shaped elements to said columns;
said mounting means for said fork-shaped elements including means for encircling the circumference of said columns; and
said columns further having a polygonal cross-sectional shape for preventing relative rotational movement between said fork-shaped elements and said columns.

26. The furnace according to claim 14, further comprising:
fork-shaped elements comprising at least two of said support elements, said fork-shaped elements further including mounting means for mounting said fork-shaped elements to said columns;
said mounting means for said fork-shaped elements including means for encircling the circumference of said columns; and
said columns further having a polygonal cross-sectional shape for preventing relative rotational movement between said fork-shaped elements and said columns.

27. The furnace according to claim 24, further comprising:
fork-shaped elements comprising at least two of said support elements, said fork-shaped elements further including mounting means for mounting said fork-shaped elements to said columns;
said mounting means for said fork-shaped elements including means for encircling the circumference of said columns; and
said columns further having a polygonal cross-sectional shaped for preventing relative rotational movement between said fork-shaped elements and said columns.

28. The furnace according to claim 1 wherein one of said first and said second mounting means is movable to cause said relative movement in directions parallel to said axis, and the other of said first and second mounting means is movable to cause said relative movement in directions concentric with said axis, such that said relative movement between said first and said second groups of support elements is achieved by a combined movement of both said first and said second mounting means.

29. A furnace for heating workpieces comprising:
a furnace chamber having a vertical central axis;
means for charging and discharging the workpieces to and from said furnace chamber;
conveyor means arranged substantially concentrically with respect to said axis, for conveying the workpieces within at least a portion of said furnace chamber;
said conveyor means comprising a first group of workpiece support elements and a second group of workpiece support elements, said first group of support elements being movable relative to said second group of support elements in substantially vertical directions parallel with respect to said axis and in substantially circular directions concentric with respect to said axis such that said relative movement provides step wise travel of the workpiece in a direction of travel concentric with said axis, the workpieces being supported alternately by said first and said second group of support elements at alternating points of engagement along the bottom surface of the workpieces;
said furnace chamber including fan means for circulating the atmosphere within said furnace chamber, said fan means including a hollow drive shaft that extends into the interior of said furnace chamber from outside of said furnace chamber such that temperature and oxygen probes may be inserted into said furnace chamber through said hollow drive shaft.

30. A plurality of furnaces for heating workpieces, each of said furnaces comprising:
a furnace chamber having a vertical central axis;
means for charging and discharging the workpieces to and from said furnace chamber;
conveyor means arranged substantially concentrically with respect to said axis for conveying the workpieces within at least a portion of said furnace chamber;
said conveyor means comprising a first group of radially extended open ended workpiece support elements and a second group of radially extending open ended workpiece support elements, said first group of support elements being movable relative to said second group of support elements in substantially vertical directions parallel with respect to said axis and in substantially circular directions concentric with respect to said axis such that said relative movement provides step wise travel of the workpieces in a direction of travel concentric with said axis, the workpieces being supported alternatively by said first and said second group of support elements at alternating points of engagement;
said relative movement being further defined by first vertical relative movement between said groups of support elements, second lateral relative movement along a circular path of travel relative to said axis between said groups of support elements, and third vertical movement between said groups of support elements such that each support element of one of said groups is raised above and lowered below at least one support element of the other of said groups and further such that said each support element passes at both sides laterally of said at least one support element in a closed loop during one cycle of said relative movement between said groups of said bar elements;
said plurality of furnaces comprising at least a first heating furnace, a second soaking furnace, and a third low temperature furnace, each of said furnaces being connected to one another.

31. The furnace according to claim 30, further including a quench bath arranged adjacent to said discharge means of said low temperature furnace.

32. A furnace for heating workpieces comprising:
a furnace chamber having a vertical central axis;
means for charging and discharging workpieces to and from said furnace chamber;
conveyor means arranged substantially concentrically with respect to said axis and being further arranged helically about said axis for conveying the workpieces within at least a portion of said furnace chamber;
said conveyor means comprising a first group workpiece support elements and a second group of workpiece support elements, said first group of support elements being movable relative to said second group of support elements in substantially vertical directions parallel with respect to said axis and in substantially circular directions concentric with respect to said axis such that said relative movement provides step wise travel of the workpieces in a direction of travel concentric with said axis, the workpieces being supported alternately by said first and said second group of support elements at alternating points of engagement;
said conveyor means having radially separated inner and outer portions;
said furnace chamber including top and bottom portions;
an inner cylinder extending between said top and said bottom portions of said furnace chamber and an outer cylinder extending between said top and said bottom portions of said furnace chamber;
said support elements of said first group being mounted on said inner cylinder along said inner portion of said conveyor means and projecting substantially radially outwardly toward said outer cylinder, and said support elements of said second group being mounted to said outer cylinder along said outer portion of said conveyor means and projecting substantially radially inwardly toward said inner cylinder;

said inner cylinder being mounted for movement with respect to said outer cylinder to provide said relative movement between said groups of said support elements, said cylinder movement being provided by a motor mounted adjacent to said bottom portion of said furnace chamber in driving engagement with said inner cylinder; and said furnace chamber being divided into upper and lower temperature zones, fan means mounted within said upper portion of said furnace chamber for circulating the atmosphere of said upper temperature zone, and fan means mounted in said lower portion of said furnace chamber for circulating the atmosphere in said lower temperature zone.

33. The furnace according to claim 32, wherein each of said fan means includes a hollow drive shaft that extends into the interior of said furnace chamber from outside of said furnace chamber so that probes may be inserted into said furnace chamber through said hollow drive shaft.

34. A furnace for heating workpieces comprising:

a furnace chamber having a vertical central axis;

means for charging and discharging the workpieces to and from said furnace chamber;

conveyor means arranged substantially concentrically with respect to said axis and being further arranged helically about said axis for conveying the workpieces within at least a portion of said furnace chamber;

said conveyor means including a first inner helically arranged portion and a second outer helically arranged portion;

said conveyor means further comprising a first group of workpiece support elements and a second group of workpiece support elements, said first group of support elements being moveable relative to said second group of support elements in substantially vertical directions parallel with respect to said axis and in substantially circular directions concentric with respect to said axis such that said relative movement provides stepwise travel of the workpieces in a direction of travel concentric with said axis, the workpieces being supported alternately by said first and said second group of support elements at alternating points of engagement;

said conveyor means having radially separated inner and outer portions;

said furnace chamber including top and bottom portions;

inner mounting means for supporting a portion of said first group of support elements and outer mounting means for supporting a portion of said second group of support elements;

at least one intermediate mounting means for supporting a portion of each of said first and said second group of support elements;

said first group of support elements that are mounted on said inner mounting means being mounted on said inner mounting means along said inner portion of said conveyor means and projecting substantially radially outwardly toward said outer portion of said conveyor means, and said second group of support elements that are mounted on said outer mounting means being mounted on said outer mounting means along said outer portion of said conveyor means and projecting substantially radially inwardly toward said inner portion of said conveyor means, and said first group of support elements mounted on said intermediate mounting means being mounted along said inner portion of said conveyor means and projecting substantially radially outwardly toward said outer portion of said conveyor means and said second group of support elements mounted on said intermediate mounting means being mounted on said intermediate mounting means along said outer portion of said conveyor means and projecting substantially radially inwardly toward inner portion of said conveyor means; and at least one of said mounting means being movable to provide said relative movement between said groups of support elements.

35. The furnace according to claim 34, wherein only one intermediate mounting means is provided and further said intermediate mounting means is movable in directions parallel to said axis and in directions circular with respect to said axis to provide said relative movement.

36. The furnace according to claim 34, wherein at least one of said groups of support elements comprise bar elements having opposed ends, said bar elements being mounted to said mounting means at one of said ends.

37. The furnace according to claim 34, wherein at least one of said groups of support elements comprise fork-shaped elements having opposed end portions, one of said end portions being mounted to said mounting means.

38. The furnace according to claim 34, further comprising:

said conveyor means being divided along its circumferential length into a plurality of segments, each of said segments including at least one element of said first group of support elements and at least one element of said second group of support elements, and at least two of said segments being spaced vertically apart from one another, such that as a workpiece advances along said conveyor means from one said segment to another vertically spaced said segment, the workpiece is transferred from one horizontal plane to a different horizontal plane with respect to said axis.

39. The furnace according to claim 34, wherein said conveyor means is divided into an inner helically arranged portion and an outer helically arranged portion, said inner helically arranged portion of said conveyor means extending between said inner mounting means and said intermediate mounting means, and said outer helically arranged portion extending between said intermediate mounting means and said outer mounting means, such that as a workpiece is charged from said charging means, the workpiece travels upwardly in a helical direction of travel along said outer helically arranged portion of said conveyor means and then downwardly in a helical direction of travel along said inner helically arranged portion of said conveyor means toward said discharge means.

40. The furnace according to claim 34, wherein each of said mounting means comprises a cylinder arranged concentrically with said axis.

41. The furnace according to claim 34, wherein said relative movement is further defined by first vertical relative movement between said first group of support elements and said second group of support elements, second lateral relative movement along a circular path of travel relative to said axis between said first group of support elements and said second group of support elements, and third vertical movement between said groups of support elements such that a workpiece is first supported by both said groups of support elements, second supported by one of said groups of support elements and third again supported by both said groups of support elements.

42. A furnace for heating workpieces, comprising:
a furnace chamber having a vertical central axis;
means for charging and discharging workpieces to and from said furnace chamber;
conveyor means arranged substantially concentrically with repect to said axes and being further arranged helically about said axis for conveying the workpieces within at least a portion of said furnace chamber;
said conveyor means comprising a first group of workpiece support elements and a second group of workpiece support elements, said first group of support elements being movable relative to said second group of support elements in substantially vertical directions parallel to said axis and in substantially circular directions concentric to said axis such that said relative movement provides stepwise travel of the workpiece in a direction of travel concentric with said axis, the workpieces being supported alternatively by said first and said second group of support elements at alternating points of engagement;
said conveyor means having radially separated inner and outer portions;
said furnace chamber including top and bottom portions;
inner mounting means extending between said top and said bottom portions of said furnace chamber and outer mounting means extending between said top and said bottom portions of said furnace chamber;
said support elements of said first group being mounted on said inner mounting means along said inner portion of said conveyor means and projecting substantially radially outwardly toward said outer mounting means, and said support elements of said second group being mounted to said outer mounting means along said outer portion of said conveyor means and projecting substantially radially inwardly toward said inner mounting means;
said inner mounting means being mounted for movement with respect to said outer mounting means to provide said relative movement between said groups of said support elements, said mounting means movement being provided by a motor mounted adjacent to said bottom portion of said furnace chamber in driving engagement with said inner mounting means; and
said furnace chamber being divided into upper and lower temperature zones, fan means mounted within said upper portion of said furnace chamber for circulating the atmosphere of said upper temperature zone, and fan means mounted in said lower portion of said furnace chamber for circulating the atmosphere in said lower temperature zone.

43. The furnace according to claim 42, further comprising:
said furnace chamber including top and bottom portions; and
said first and said second mounting means comprising columns extending between said top and said bottom portions of said furnace chamber.

44. The furnace according to claim 42, further comprising:
said furnace chamber including top and bottom portions;
and one of said first or said second mounting means comprises a plurality of columns extending between said top and said bottom portions of said furnace and the other of said first and said second mounting means comprises a cylinder extending between said bottom and said top portions of said furnace.

45. The furnace according to claim 43, further comprising:
fork-shaped elements comprising at least two of said support elements, said fork-shaped elements further including mounting means for mounting said fork-shaped elements to said columns;
said mounting means for said fork-shaped elements including means for encircling the circumference of said columns; and
said columns further having a polygonal cross-sectional shape for preventing relative rotational movement between said fork-shaped elements and said columns.

46. Furnace according to claim 42, wherein each of said fan means includes a hollow drive shaft that extends into the interior of said furnace chamber from outside of said furnace chamber so that probes may be inserted into said furnace chamber through said hollow drive shaft.

47. Furnace according to claim 43, wherein each of said fan means includes a hollow drive shaft that extends into the interior of said furnace chamber from outside of said furnace chamber so that probes may be inserted into said furnace chamber through said hollow drive shaft.

48. Furnace according to claim 44, wherein each of said fan means includes a hollow drive shaft that extends into the interior of said furnace chamber from outside of said furnace chamber so that probes may be inserted into said furnace chamber through said hollow drive shaft.

49. Furnace according to claim 45, wherein each of said fan means includes a hollow drive shaft that extends into the interior of said furnace chamber from outside of said furnace chamber so that probes may be inserted into said furnace chamber through said hollow drive shaft.

* * * * *